United States Patent Office 3,253,886
Patented May 31, 1966

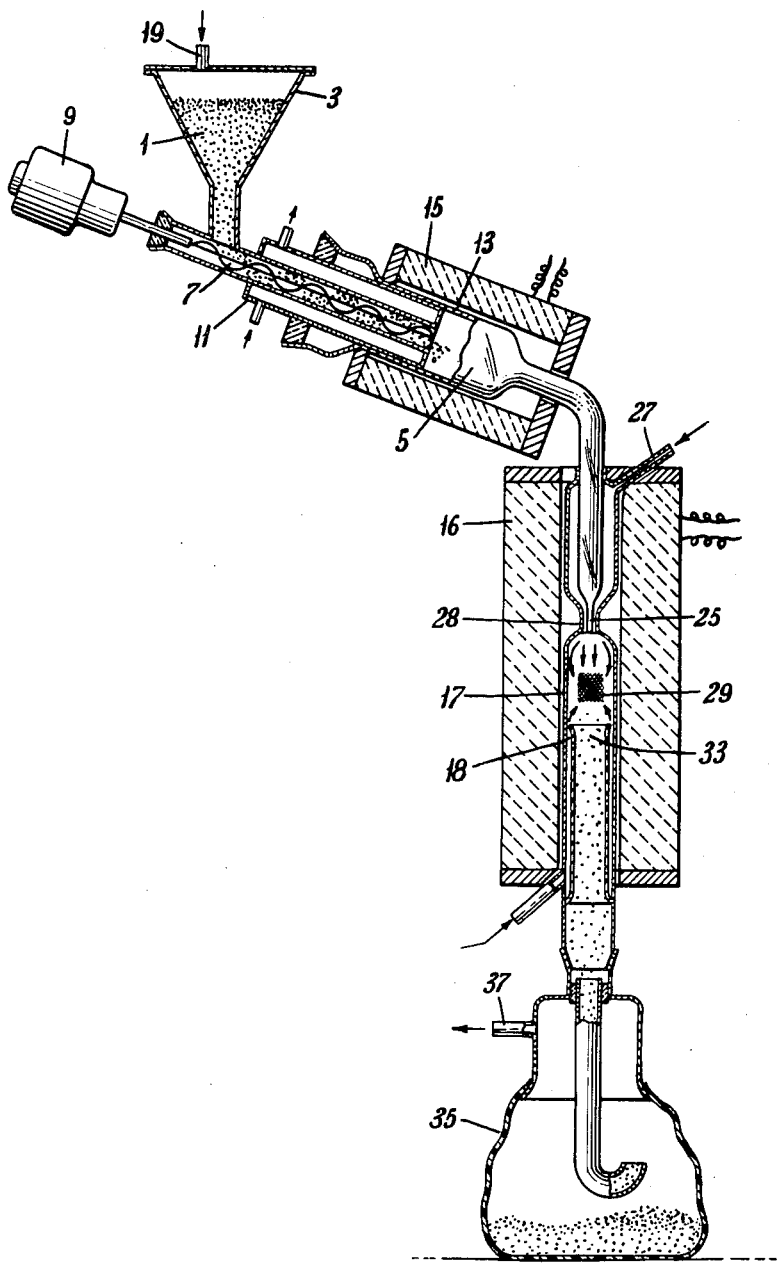

3,253,886
PROCESS FOR PRODUCING ULTRAFINE POWDERS OF REFRACTORY MATERIALS
Headlee Lamprey, Lewiston, and James B. Culbertson and Robert L. Ripley, Lockport, N.Y., assignors to Union Carbide Corporation, a corporation of New York
Filed May 9, 1961, Ser. No. 108,926
9 Claims. (Cl. 23—134)

The present invention relates to the production of ultrafine powders of the borides, carbides, nitrides, silicides and sulfides of the metals Groups VB and VIB and the ferrous metals of Group VIII of the periodic table, the ultrafine powders being formed of substantially uniform sub-micron particles. More particularly, the present invention relates to a process for producing powders of the aforesaid materials formed of substantially uniform particles having a diameter of less than about 0.1 micron.

The above mentioned boron, carbon, nitrogen, silicon and sulfide materials are known to have wide utility. It is also known that these materials have greatly increased utility when in the form of uniform ultrafine powders.

Accordingly, it is an object of the present invention to provide a simple and economical process for producing uniform ultrafine powders of the borides, carbides, nitrides, silicides and sulfides of metals selected from Groups VB and VIB and the ferrous metals of Groups VIII of the periodic table, the particles of the powders derived from the process being less than about 1 micron in diameter.

It is another object to provide a process for the production of ultrafine powders of the aforesaid materials, the powders being formed of substantially uniform particles having a grain size of less than 0.1 micron.

These and other objects will be apparent from the following description and claims taken in conjunction with the drawing in which:

The figure shows, partly in section, an elevational view of an apparatus suitable for the continuous production of uniform sub-micron powders in accordance with the present invention.

In accordance with the present invention a process is provided for producing uniform ultrafine sub-micron powders of a composition selected from the group consisting of borides, carbides, silicides, nitrides and sulfides of the metals of Groups VB and VIB and the ferrous metals of Group VIII. The process of the present invention comprises introducing a halide vapor of the selected metal and a reactant gas into a reaction zone located within a reactor and spaced away from all surfaces thereof, said reactant gas comprising a vapor bearing the nonmetallic material with which the selected metal is to be combined and sufficient hydrogen to reduce the halide vapor to produce the desired selected metal compound; spontaneously reacting the halide vapor and the reactant gas only within the reaction zone to form sub-micron particles of the selected metal compound out of contact with all reactor surfaces; rapidly removing the thus formed sub-micron particles from contact with reacting vapor and reactant gas; and subjecting the sub-micron particles to a temperature which limits drain growth to a predetermined sub-micron size.

While the present invention relates generally to ultrafine powders formed of substantially uniform particles less than about 1 micron in diameter, it is particularly directed to the production of powders formed of substantially uniform particles having a grain size of less than 0.1 micron. Uniform powders consisting of particles of this size are not known to the industrially available.

The process of the present invention produces uniform finely-divided metal compound powders by the spontaneous chemical reaction of a halide of a selected metal at an elevated temperature in the gas phase with a reactant gas. The reactant gas employed in the process of the present invention comprises hydrogen and a vapor bearing the non-metallic material with which the selected metal is to be combined. The hydrogen serves as a reductant for the metal halide vapor while the carbon, boron, silicon, nitrogen or sulfur in the reactant gas unites with the reduced metal to provide the desired metal compound. The term reactant gas as employed herein is a gas containing both hydrogen and the nonmetallic material, or materials, with which a selected metal is to be combined. The hydrogen can be combined with a vapor containing the non-metallic, e.g., methane when producing carbide powders, in which case the methane is the reactant gas. When necessary, to produce a particular desired product, additional hydrogen can be added. The reactant gas can also be a mixture of hydrogen with entrained particles of the non-metallic material, such as occurs when a non-metallic bearing vapor, e.g., methane, is decomposed by preheating or otherwise. The above discussion applies equally to reactant gases employed in producing uniform sub-micron powders of borides, silicides, nitrides, and sulfides in accordance with the present invention.

As stated above, in the production of ultrafine carbide powders, methane can be used as the reactant gas.

Additionally other hydrocarbons and halogenated hydrocarbons which are volatile can be used; these materials are mixed with hydrogen gas when additional hydrogen is required for reducing purposes. Equally, volatile halogen derivatives of hydrocarbons, mixed with hydrogen reducing gas, can be employed in the production of sub-micron carbide powders. Similarly, hydroborides, (boranes), halogenated hydroborides, and halogen derivatives of hydroborides are employed to produce uniform, sub-micron boride powders; hydrosilicides (silanes), halogenated hydrosilicides and halogen derivatives of hydrosilicides are employed to produce uniform, sub-micron silicide powders; nitrogen, hydronitrides, halogenated hydronitrides and halogen derivatives of hydronitrides are employed to produce uniform sub-micron nitride powders; and sulfur, hydrogen sulfide, and sulfur halides are employed to produce uniform, sub-micron sulfide powders.

The following group includes some of the materials that can be used in vapor form in the reactant gas: $CH_4$, $C_6H_6$, $C_2H_4$, $C_2H_2$, $C_6H_{12}$, $C_2H_4Cl_2$, $B_2H_6$, $B_5H_9$, $B_{10}H_{14}$, $B_6H_2$, $BCl_3$, $BBr_3$, $BI_3$, $NH_3$, $N_2H_4$, $N_2$, $NCl_3$, $N_2H_4 \cdot NH_3$, $HN_3$, $SiH_4$, $SiH_3Cl$, $SiH_2Cl_2$, $SiHCl_3$, $SiCl_4$, $SiBr_4$, $SiI_4$, $H_2S$, $S$, $S_2Cl_2$, $SCl_4$, $S_2Br_2$.

In a further embodiment of the present invention, vapor mixtures of one or more of the above-mentioned materials can be used in the reactant gas to provide particles formed of mixtures or solid solutions refractory materials as exemplified in Table I.

TABLE I

| Reactant Gas | Particle Composition |
|---|---|
| $MoCl_5+WCl_6+H_2+CH_4$ | $W_2C+Mo_2C$ |
| $CbCl_5+CH_4+NH_3+H_2$ | $CbN+CbC$ |
| $CbCl_5+TaCl_5+CH_4+BH_3+H_2$ | $CbC+CbB+TaC+TaB$ |
| $MoCl_5+WCl_6+H_2+H_2S$ | $MoS_2+WS_2$ |

In another embodiment of the present invention, a volatile compound, containing both carbon and another non-metallic (B, Si, N, S), is used in the reactant gas to provide sub-micron particles consisting of a selected metal in combination with carbon and one or more of the aforesaid non-metallic materials. For this embodiment, the following substituted hydrocarbons exemplify the materials which can be used in the reactant gas:

$Si(CH_3)_4$, $Si_2(CH_3)_6$, $Si(C_6H_5)_4$, $Si(C_2H_5)_4$, $CH_3SH$, $C_2H_5SH$, $(CH_3)_2BBr$, $C_5H_5N$, $C_4H_4N_2$.

In the production of the ultrafine powders, it is made certain that the particle-forming reaction takes place in free space away from all surrounding substate. The sub-micron particles are formed directly at the reaction temperature, and then rapidly cooled to prevent enlargement of the particles to above the desired sub-micron size.

The importance of carrying out the particle-forming reaction in the gas phase may be better understood from the following discussion. Assume an element of volume $dx, dy, dz$, containing the chemicals which react to form a solid particle of the compound being produced. As these chemicals react, the weight and size of the particle formed will be determined by the amount of matter contained in the element $dx, dy, dz$, and by the rate of ingress of fresh reactants therein through diffusion or other means. Since matter is least dense in the vapor state, the particles produced will be smallest if the reactants are gaseous, provided that the particles initially formed are not allowed to grow in size through exposure to fresh reactants at the reaction temperature. Within the volume element $dx, dy, dz$, depletion of the reactants around the growing solid nucleus leads to the termination of the reaction thereby resulting in the formation of a small particle. This particle is, however, extremely prone to act as a precipitation or condensation nucleus for the buildup of a larger particle.

Accordingly, to prevent the formation of particles greater than sub-micron size, the sub-micron particles which are formed in the reaction zone are rapidly removed from contact with reacting halide vapor and reductant; additionally, the turbulence, velocity, and directions of the gases in the reactor are controlled so that the sub-micron particles, as they are formed, can freely exit the reaction zone and are not dispersed in the reactor. Maintaining the turbulence in the reactor at a minimum is an important feature of the present invention in order to ensure that sub-micron particles are not retained in a high temperature region for any extended period of time since it is essential that the sub-micron particles formed in the reaction zone be rapidly exposed to a temperature will limit particle grain growth to the desired sub-micron size.

For example, in order to produce a uniform powder of less than 0.1 micron particle size, the sub-micron particles which are formed in the reaction zone are subjected to a quenching temperature below approximately one-half the sublimation temperature, decomposition temperature, or melting point of the particular compound, whichever is lowest; temperatures greater than about one-half this temperature for a particular compound provide increasingly larger particles, and at temperatures higher than about 100° C. above this temperature, some of the particles will be greater than sub-micron size and the powder produced will be generally lacking in uniformity. Lower temperatures will provide for the production of uniform powders of increasingly smaller diameters.

It can be stated generally that quenching temperatures between about 450° C. and 1000° C. will ensure the production of uniform sub-micron powders, the lower temperatures being used at least with the compounds having the lower melting points, sublimation temperatures or decomposition temperatures.

In certain embodiments of the present invention, the metal halide vapor and reactant gas are separately heated to the vapor state or to the temperature at which they will react spontaneously, whichever is higher. Usually, for convenience, both the halide vapor and reactant gas are heated to the same temperature, which is referred to herein as the preheat temperature.

The preheat temperature is not necessarily the same as the reaction temperature, which is the temperature in the reaction zone wherein the sub-micron particle-forming reaction is taking place. Generally it is lower, since most of the reactions within the scope of the present invention are exothermic and release additional heat during the reaction. In some of these cases there may be flame combustion on mixing the reactants.

The preheated gases, with or without inert diluents, are brought together in a reaction zone within a reaction chamber where the halide vapor and reactant gas react spontaneously to form sub-micron metal compound particles. It is essential that the reaction zone be located spaced away from all the surfaces of the reactor in order to prevent the formation of film deposits and particles of greater than sub-micron size. It is also important to maintain the reaction zone in a confined and relatively small space within the reactor so that the gases in the reactor can be maintained substantially free from turbulence thereby preventing dispersion of the product sub-micron particles within the reactor.

When preheated reactant gases are separately conducted to the reactor through inlet tubes or nozzles, it is necessary to provide some means to prevent a metal compound-producing reaction at the tips of the tubes or nozzles since unless this is done, massive formations will buildup and disrupt the in-flow of reactants. This problem can be solved, when the reaction occurs as a flame, by placing a diffuser screen or similar device between the gas inlet tubes and the reaction zone thereby keeping the reaction confined to the flame side of the screen.

Another means for preventing the formation of deposits on the inlet tubes or nozzles and for maintaining the reaction zone in free space is to sheath one or both of the incoming gas streams with a co-current non-reactive gas. This technique prevents mixing of the gases until they are at a predetermined distance from the inlet tubes or nozzles.

A further technique to provide a free-space reaction remote from the surfaces of the reactor is to slip two preheated reactant gases over one another, counter-currently, in a large horizontally extending tube. Particles of sub-micron size are formed at the interface and the problem of clogging can be avoided.

For certain reactions there is a marked advantage in inducing the reaction by specific activation of one or more of the reacting species, so that the reaction can be made to take place at temperatures below which it normally occurs. This can be accomplished in a variety of ways, for example, by means of a glow discharge, spark, catalyst, or sudden pressure change. These modifications of the process can be extremely important in cases where the desired reaction occurs only at temperatures above the decomposition temperature of one of the reacting materials. In addition to the above, a catalyst material, such as a powder, can be conveyed in one of the incoming gas streams or it can merely be dropped into the reaction zone.

As has been stated above, it is an essential part of the present invention that the reactor be arranged to permit the sub-micron particle-forming reaction to take place in free space, i.e., remote from reactor walls. If the reacting vapors are allowed to impinge on the reactor surfaces while the product powders are being formed, relatively large "plated" deposits are produced which are more or less continuous rather than powdery. The "plated" particles are considerably greater than 1 micron in size and unless this formation is prevented, these larger particles will contaminate the product. Further, continued grain growth of the plated particles will greatly reduce process efficiency and possibly result in clogging of the reactor. Spherically or cylindrically shaped reaction vessels serve well to isolate the reaction from the walls when proper arrangement and control of the gaseous materials is provided. The reaction vessels may be made of glass, metal or other suitable material, although depending on the reaction being carried out and the desired purity of the powder being produced, special materials such as fused quartz may be preferred.

The sub-micron powder-forming reaction of the present invention is usually carried out at atmospheric pressure and on a continuous basis. It has been found, however, that there are certain advantages to working at higher or lower pressures. One advantage of lower pressure is that increasingly smaller particle sizes of the products can be produced. Lower pressure also makes for easier volatility and improved thermal stability of some of the reactant species. Advantages of higher pressure operation are (1) the easier control of the equilibria occurring in the reactor, and (2) increased yield of product.

A specific embodiment of the present invention embraces batch or intermittent operation. It has been found that such operation is advantageous when working with highly exothermic reactions since, during a continuous operation, the temperature may increase with a deleterious effect on the particle size of the product. Batch or intermittent operations provide a means of moderating this temperature. Intermittent operation can be effected such that the reactive gas mixture can be introduced pulse-wise into the reaction chamber, synchronizing the injection of fresh reactants with the ejection of reaction products.

Another means of achieving a temperature-moderating result is to provide water, or other type cooling for the reaction walls.

Since it is important in the present invention to provide a substantially turbulence-free environment surrounding the reaction zone, the shape and geometry of the reactor and gas inlet means are important design considerations. Expanding nozzles and tips of controlled geometrical shapes have been used with advantage to provide substantially stream-line flow of the reactants into the reaction zone. Using a bundle of parallel fine tubes to convey the reactants to the reactor can be employed for the same purpose as well as a lesser number of larger tubes; in certain circumstances, particularly to avoid back-diffusion and while maintaining high volume throughput, the former has proved advantageous. A further embodiment of the present process comprises premixing the reactant gases, preheating them to a desired temperature short of the reaction temperature, and then suddenly bringing them to reaction temperature, thus forming sub-micron particles. This sudden development of reaction temperature can be brought about in various ways. One effective method is to inject the premixed and preheated gases into the reactor which contains superheated gases whereby the incoming gases are suddenly heated to the desired temperature. Another method is to spark or ignite the gas mixture whereby the required temperature increase is obtained from the developed heat of reaction.

In order to prevent the growth of the sub-micron particles once formed, these particles must be cooled to a temperature at which continued grain growth will not occur. One manner of achieving this result is to quench the reactant gases and entrained particles by passing these materials into a large volume of cold argon or other inert gas or liquid. Another technique is to cool the gases and particles by sudden expansion of the gases. A further method is to maintain the reaction zone length as short as possible and rapidly withdrawing the sub-micron product from the reaction zone.

A further, indirect method of maintaining sub-micron particle size is through dilution of the reactants with inert gases. A still further, indirect means of preventing growth of the sub-micron particles is to keep the reactants entering into the reaction zone in such mass ratios as will favor or force the reaction to go to completion rapidly. Yet another, indirect means of particle size control is through control of the reaction temperature. In general, a higher reaction temperature gives a faster reaction which in turn favors a finer product. By providing for rapid withdrawal of the product particles, sub-micron metal compound particles can be achieved through control of reaction temperature alone.

In order to more clearly illustrate the practice of the present invention a detailed description of a preferred embodiment thereof for the production of uniform, ultrafine sub-micron tungsten carbide powder is presented hereinbelow with reference to the drawing.

The preferred process for the production of uniform sub-micron tungsten carbide powders comprises injecting a stream of tungsten hexachloride vapor into a reaction zone located within a reactor and spaced away from all surfaces thereof; sheathing the halide vapor with a co-current stream of nonreactive gas; forming sub-micron particles of tungsten carbide out of contact with the surfaces of the reactor by spontaneously reacting the halide vapor with methane only in the reaction zone; rapidly removing the thus formed sub-micron particles from contact with reacting vapor and reducing agent; and subjecting the product sub-micron particles to a temperature which will limit particle grain growth to a predetermined sub-micron size.

In the above-described process a stream of metal halide vapor, sheathed with a co-current stream of nonreactive gas, is injected into a portion of a reactor which is spaced away from all surfaces of the reactor and which is designated herein as the reaction zone. The halide vapor is contacted by and reacts with the methane only in the reaction zone and, by supplying sufficient energy to the halide vapor and methane gas to provide a spontaneous, sustained tungsten carbide producing reaction, a sub-micron powder is formed in space, i.e., in the reaction zone remote from the surfaces and structure of the reactor, and the formation of large particles and film is avoided. The sub-micron tungsten carbide particles formed in the reaction zone are rapidly removed therefrom by the gaseous stream of unreacted gas and by-product materials, to a portion of the reactor maintained at a temperature which limits the grain growth of the sub-micron particles. The sub-micron particles are ultimately collected in a suitable receptacle.

In the production of sub-micron tungsten carbide powder as described above, a reactor is provided and preheated methane gas is introduced into the reactor. A preheated stream of tungsten hexachloride vapor, and a co-current sheathing stream of non-reactive gas, such as argon, are injected downward through concentric nozzles into a portion of the reactor spaced away from all surfaces of the reactor, i.e., the reaction zone. The preheated reactants, at a temperature between about 450° C. and about 1300° C. provide a spontaneous, self-initiated and self-sustaining sub-micron particle-producing reaction within the reaction zone. The argon gas shields the halide vapor stream from the surfaces of the reactor and forestalls reaction of the halide until the contact thereof with methane in the reaction zone. Additionally, the non-reactive gas is effective in preventing the reacting materials and product particles from contacting the reactor surfaces, and also in rapidly removing the sub-micron particles from the reaction zone to a cooler zone in which undesired grain growth is prevented.

The tungsten carbide powder-producing reaction is evidenced by a "flame" in the reaction zone, i.e., spaced away from the surfaces of the reactor and spaced away from and below the concentric sheath gas and vapor nozzles. The position of the "flame" and hence of the reaction zone, can be and is maintained confined in a restricted space, remote from the nozzles, by adjustment of the velocities of the sheathing gas and halide vapor; increasing the velocities tends to increase the separation of the "flame" from the nozzles. During the practice of the present invention, the flow of gaseous materials in the reactor is controlled so as to maintain the space adjacently surrounding the reaction zone in a substantially turbulence-free condition.

The above described embodiment of the process of the present invention is efficiently conducted in the apparatus of co-pending application serial number 107,570, filed May 3, 1961, which is illustrated in the figure.

With reference to the figure, a solid metallic halide 1, for example, tungsten hexachloride, is provided in hopper 3 which is enclosed to exclude air. The solid metal halide 1 is fed into halide vaporizing zone 5 by a screw-feed mechanism 7 driven by a motor 9 which is adapted to be operated at different speeds of rotation so as to control the rate at which the halide is fed into the vaporizing zone. The screw-feed mechanism 7 is surrounded by water jacket 11 to prevent premature vaporization of the halide. Halide vaporizer 13, which encloses vaporizing zone 5 is heated by means of vaporizing furnace 15 to maintain the temperature in the vaporizing zone sufficiently high to cause the halide to be rapidly transferred into the vapor state. Methane gas, preheated to between 400° C. and 1500° C. by reaction furnace 16 is introduced into the reaction chamber of reactor 17 through annular vent 18 and provides a methane atmosphere in the reactor. The halide vapor produced in the vaporizing zone is likewise preheated to between 400° C. and 1500 ° C. by reaction furnace 16 and passes into the tubular reaction chamber of reactor 17 with an inert gas such as argon. The argon is introduced through carrier gas inlet 19 to eliminate the possibility of diffusion of metal halide vapors into the halide feed mechanism. The metal halide vapor is injected downwardly into reactor 17 by means of halide vapor nozzle 25 which is centrally aligned with the reaction chamber; and a sheathing or shielding non-reactive gas, such as argon, introduced through inlet 27, is injected co-current with the halide vapor stream into reactor 17 through annular shield gas nozzle 28. Nozzle 28, surrounding nozzle 25 communicates with the reaction chamber and is arranged to be concentric with and to terminate in approximately the same horizontal plane as halide vapor nozzle 25. The co-current stream of shield gas, injected through annular nozzle 28, provides what may be described as an envelope or sheath for the halide vapor and the halide vapor is caused to thereby contact and react with the methane gas only in reaction zone 29 which is spaced away from the surfaces of the reactor and below the nozzles. The contact between the preheated halide vapor and preheated methane promotes a spontaneous, self-initiating and self-sustained sub-micron tungsten carbide particle-forming reaction which is evidenced by a "flame" in the reaction zone spaced away from the surfaces of the reactor and below the nozzles. The co-current streams of shield gas and halide vapor are adjusted so that between the nozzles 25 and 28, and the reaction zone 29, the halide vapor is shielded from the surfaces of the reactor whereby the sub-micron particle-forming reaction is forestalled until the halide vapor is contacted by the methane gas in the reaction zone 29.

In order to avoid the possibility of solid tungsten carbide formation, the reaction chamber of reactor 17, as illustrated in the drawing, is arranged having the upper and inner surfaces thereof curved outward from the reaction zone, and having a diameter at least about three times that of the shield gas nozzle whereby the surfaces and structure of the reactor are located remote from the reaction zone.

Further, as shown in the figure, the upwardly flowing methane gas, upon contacting the downwardly flowing stream of shield gas, is directed toward the reaction zone thereby further ensuring a sub-micron particle-forming reaction located out of contact with the structure and surfaces of the reactor.

The sub-micron tungsten carbide particles formed in the reaction zone are rapidly directed to a cooler zone, in which further grain growth is prevented, by the combined gas currents of argon, unreacted methane gas, product halide gas, and by gravity. This cooler zone in the illustrated apparatus is the portion of the reactor directly below the reaction zone. In the illustrated apparatus the temperature in the cooler zone is about the same as the preheat temperature of the reactants. However, by modifying the apparatus, the temperature in the cooler zone can be independently varied to control the final particle size. The product sub-micron particles ultimately exit the reactor through outlet 33 located below the reaction zone and interior annular reducing gas vent 18. A suitable collector, such as polyethylene bag 35 is provided to collect the ultrafine metal particles, and an outlet 37 is further provided for the exit of waste gases from the reactor.

In place of argon, other suitable gases which may be employed in the above-described process include the inert gases designated in the periodic table.

In the production of ultrafine metal powders in accordance with the present invention, the proportion of hydrogen gas to metallic halide vapor is regulated to be equal to or greater than that which is thermodynamically required to produce a powder having a predetermined desired metal halide content; the metal halide content of the ultrafine powder decreases with an increasing ratio of hydrogen gas to halide vapor. In the production, tungsten carbide powder, a mole ratio of hydrogen to tungsten hexachloride above 3 is suitable; however the preferred mole ratio of hydrogen to tungsten hexachloride is about 9, at which value high grade ultrafine tungsten carbide powder is efficiently produced.

The following Example I will serve to illustrate the previously described process:

*Example I*

Employing the apparatus described above and illustrated in the figure, 6.61 grams per minute of tungsten hexachloride were fed into the halide vaporizing zone to provide tungsten hexachloride vapor at the rate of 16.7 millimols per minute through the halide vapor nozzle. Argon, the shield gas, was fed at the rate of 375 milliliters per minute, or 16.7 millimols per minute, (calculated at 25° C.) and methane was fed into the reactor at the rate of 375 milliliters per minute or 16.7 millimols per minute (calculated at 25° C.). Hydrogen was fed into the reaction chamber at the rate of 50.1 millimols per minute or 1150 milliliters per minute at 26° C. The mole fractions of these gases were 0.2, 0.2, and 0.6, respectively. These proportions provided one mole of methane for each mole of tungsten hexachloride. The halide and methane pre-heated to between about 950° C. to 1000° C., mixed and reacted in the reaction zone. The reaction was evidenced by a "flame" in the reaction zone spaced below the nozzles and spaced away from the surfaces of the reactor. The product tungsten carbide particles thus formed were rapidly removed from the reaction zone by excess hydrogen, argon, and hydrogen chloride gas and were deposited in the collector. A metal recovery from the halide of 100 percent was achieved.

The resulting powders were uniform particle size and shape. The average particle diameter was 0.02 micron. The powder analyzed as follows: 92.24% tungsten, 6.2% total carbon, 2.6% free carbon, 1.1% oxygen.

The above analysis shows that the particles have a composition approximately the theoretical analysis for $W_2C$ (3.1% carbon).

In the production of ultra-fine tungsten carbide powders in accordance with the present invention, it has been discovered that when employing tungsten hexachloride, the process operating temperature, i.e., the pre-heat temperature of the reactants, should not be less than about 400° C. When operating at temperatures below this minimum range, the reaction is slow and further, excessive amounts of enveloping or shielding gas are required to prevent the formation of particles larger than about 0.1 micron average diameter. The preferred upper limit of the cooling zone temperature to ensure the production of particles less than 0.1 micron in size is approximately 1600° C., since prolonged exposure of the sub-micron particles to temperatures in excess of this limit causes the formation of relatively large particles of greater than sub-micron size owing to the grain growth of the tungsten carbide formed in the process. The practical upper limit of temperature, however, is governed by the working temperatures of materials of construction. For best operation, in an apparatus constructed entirely of quartz, the optimum operating temperature was found to be around 800° C. for producing uniform particles of less than 0.1 micron.

In the production of tungsten carbide and other materials in accordance with the present invention, energy is supplied to the reactants to provide a metal compound producing reaction at a reaction temperature above that at which the reactants are volatile and below that at which melting of the thus formed ultrafine particles occurs. Preferably, the reaction temperature is maintained below the sintering temperature of the sub-micron particles formed in the reaction zone.

Ultrafine, uniform sub-micron carbide, boride, nitride and silicide and sulfide powders of metals, other than tungsten, from Groups VB, VIB and the ferrous metals of Group VIII, can also be similarly produced by the methods described hereinabove.

In some instances improved process operation is obtained by employing a halogen gas, in place of argon, as the sheathing gas. This modification of the present invention is illustrated in the following Example II.

*Example II*

Tungsten hexachloride vapor and methane were reacted as in Example I except that chlorine gas was employed as the sheathing gas and the methane was introduced directly into the halide vapor stream at a point about 4 inches downstream from the halide vapor nozzle. The operation was continued for about one hour and the product collected and analyzed.

| | Percent |
|---|---|
| Tungsten | 92.24 |
| Total carbon | 6.2 |
| Free carbon | 2.6 |
| Oxygen | 1.1 |

It was found that the above-described techniques improved process operation by preventing the formation of solid deposits at the inlet nozzles. The average particle size was 0.03 micron.

*Example III*

Sub-micron, uniform tantalum silicide powder formed of particles having a grain size of less than 0.1 micron is produced in a continuous operation in the following manner:

A stream of $TaCl_5$, at a rate of 2 moles per hour, is pre-heated to 800° C.; a stream of hydrogen at 0 to 100 moles per hour is preheated to the same temperature. The halide vapor stream is sheathed with an argon stream (2 to 10 moles per hour). The chloride vapor and hydrogen are introduced into a reaction and are admixed and reacted in a reaction zone spaced away from all reactor surfaces and substrate; simultaneously a stream of $SiH_4$ (2 moles per hour) is introduced into the reaction zone through a water-cooled pipe. The sub-micron tantalum silicide particles formed in the reaction zone are rapidly removed therefrom and subjected to a temperature about equal to the preheat temperature (800° C.). The thus produced sub-micron tantalum silicide particles are continuously removed from the reactor and collected by electrostatic means. The average particle size is about 0.07 micron.

*Example IV*

Sub-micron, uniform molybdenum sulfide powder formed of particles having a grain size of less than 0.1 micron is produced in a continuous operation in the following manner:

A stream of $MoCl_5$ is preheated to 800° C.; a stream of $H_2S$, at 4 moles per hour, and a stream of hydrogen at 1 to 100 moles per hour are preheated to the same temperature. The chloride vapor stream is sheathed with an argon stream (2 to 10 moles per hour). The chloride vapor, $H_2S$ and hydrogen are introduced into a reactor and are admixed and reacted in a reaction zone spaced away from all reactor surfaces and substrate. The sub-micron molybdenum sulfide particles formed in the reaction zone are rapidly removed therefrom and subjected to a temperature about equal to the pre-heat temperature (800° C.). The thus produced sub-micron molybdenum sulfide particles are continuously removed from the reactor and collected by electrostatic means; 0.08 micron average.

*Example V*

Sub-micron, uniform columbium nitride powder formed of particles having a grain size of less than 0.1 micron is produced in a continuous operation in the following manner:

A stream of $CbCl_5$, at a rate of 2 moles per hour, is preheated to 800° C.; a stream of $NH_3$, at 2 moles per hour, and a stream of hydrogen at 2 to 100 moles per hour are preheated to the same temperature. The chloride vapor stream is sheathed with an argon stream (2 to 10 moles per hour). The reactants were mixed in a reactor and react in a zone spaced away from all reactor surfaces and substrate. The sub-micron columbium nitride particles formed in the reaction zone are rapidly removed therefrom and subjected to a temperature about equal to the pre-heat temperature (800° C.). The thus produced sub-micron columbium nitride particles are continuously removed from the reactor and collected by electrostatic means. The average particle size is 0.06 micron.

*Example VI*

Sub-micron, uniform columbium carbide powder formed of particles having a grain size of less than 0.1 micron is produced in a continuous operation in the following manner:

A stream of $CbCl_5$, at a rate of 2 moles per hour, is preheated to 800° C.; a stream of methane, at 2 moles per hour, and a stream of hydrogen at 2 to 100 moles per hour are preheated to the same temperature. The chloride vapor stream is sheathed with an argon stream (2 to 10 moles per hour). The chloride vapor and hydrogen are introduced into a reactor and are admixed and reacted in a reaction zone spaced away from all reactor surfaces and substrate. The sub-micron columbium carbide particles formed in the reaction zone are rapidly removed therefrom and subjected to a temperature about equal to the preheat temperature (800° C.). The thus produced sub-micron columbium carbide particles are continuously removed from the reactor and collected by electrostatic means. The average particle size is 0.05 micron.

*Example VII*

Sub-micron, uniform tantalum boride powder formed of particles having a grain size of about 0.03 micron is produced in a continuous operation in the following manner:

A stream of $TaBr_5$, at a rate of 2 moles per hour, is preheated to 800° C.; a stream of hydrogen at 0 to 100 moles per hour is preheated to the same temperature. The halide vapor stream is sheathed with an argon stream (2 to 10 moles per hour). The chloride vapor and hydrogen are introduced into a reactor and are admixed and reacted in a reaction zone spaced away from all reactor surfaces and substrate; simultaneously a stream of diborane (2 moles per hour) is introduced into the reaction zone through a water-cooled pipe. The sub-micron tantalum boride particles formed in the reaction zone are rapidly removed therefrom and subjected to a temperature about equal to the pre-heat temperature (800° C.). The thus produced sub-micron tantalum boride particles are continuously removed from the reactor and collected by electrostatic means.

The following table lists the approximate temperatures to which sub-micron particles formed in the reaction zone must be subjected in order to ensure a uniform sub-micron powder formed of particles having about the grain size listed in the Table II.

TABLE II

| Material | Quenching Temperature, °C. | Average Particle Size, micron |
| --- | --- | --- |
| $MO_2C$ | 800 | 0.075 |
| TaN | 1,000 | 0.03 |
| CrB | 450 | 0.03 |
| VSi | 550 | 0.07 |
| $MoS_2$ | 300 | 0.05 |

In the practice of the present invention, the average particle size of the powder produced can be controlled by varying the quenching temperature, i.e., the temperature to which the particles are rapidly removed from the reaction zone, the lower temperatures providing smaller particle size. The powders thus obtained are characterized by being formed of particles of substantially the same size and shape. That is, substantially more than a major proportion of the particles correspond to the average particle size. The characteristic uniformity of the powder makes possible a very close control of grain size in the production of coalesced and sintered articles.

The periodic table referred to herein is that which appears in Fundamental Chemistry, 2d edition, by H. G. Deming, J. Wiley and Sons.

What is claimed is:

1. A process for the production of uniform ultra-fine sub-micron powders of a composition selected from the group consisting of borides, carbides, silicides, nitrides and sulfides of the metals of Groups VB and VIB and the ferrous metals of Group VIII, said process comprising introducing a halide vapor of the selected metal and a reactant gas into a reaction zone located within a reactor and spaced away from all surfaces thereof, said reactant gas consisting essentially of a vaporized compound of a material selected from the group consisting of boron, carbon, silicon, nitrogen and sulfur with hydrogen, the amount of hydrogen being at least sufficient to reduce the halide vapor to produce the desired selected metal and the amount of vaporized compound being at least sufficient to react with the produced selected metal to provide the desired selected composition; spontaneously reacting the halide vapor and the reactant gas only within the reaction zone to form sub-micron particles of the selected composition out of contact with all reactor surfaces; rapidly removing the thus formed sub-micron particles from contact with reacting vapor and reducing agent; and subjecting the sub-micron particles to a quenching temperature between 450° C. and 1000° C. and which is below one half the sublimation, decomposition and melting point temperatures of the selected composition.

2. A process in accordance with claim 1 for producing uniform sub-micron powders of tungsten carbide wherein said halide vapor is tungsten hexachloride and wherein said gaseous reducing agent is methane.

3. A process in accordance with claim 1 for producing uniform sub-micron powders of columbium carbide wherein said halide vapor is $CbCl_5$ and said reactant gas is a mixture of hydrogen and methane.

4. A process in accordance with claim 1 for producing uniform sub-micron powders of tantalum boride wherein said halide vapor is $TaBr_5$ and said reactant gas is diborane.

5. A process in accordance with claim 1 for producing uniform sub-micron powders of tantalum silicide wherein said halide vapor is $TaCl_5$ and said reactant gas is $SiH_4$.

6. A process in accordance with claim 1 for producing uniform sub-micron powders of molybdenum sulfide wherein said halide vapor is $MoCl_5$ and said reactant gas is a mixture of hydrogen and $H_2S$.

7. A process in accordance with claim 1 for producing uniform sub-micron powders of columbium nitride wherein said halide vapor is $CbCl_5$ and said reactant gas is a mixture of hydrogen and $NH_3$.

8. A process for the production of uniform ultra-fine sub-micron powders of tungsten carbide which comprises introducing tungsten hexachloride vapor, methane and hydrogen at a temperature between 400° C. and 1500° C. into a reaction zone located within a reactor and spaced away from all surfaces thereof; spontaneously reacting said chloride vapor, hydrogen and methane to provide a flame reaction only within said reaction zone to form sub-micron particles of tungsten carbide out of contact with all reactor surfaces; rapidly removing the thus formed sub-micron particles from the reaction zone; and subjecting the sub-micron particles to a quenching temperature of about 800° C.

9. A process in accordance with claim 8 wherein the mole ratio of tungsten hexachloride, methane and hydrogen is 1:1:3.

References Cited by the Examiner

UNITED STATES PATENTS

| 2,488,439 | 11/1949 | Schaumann | 106—300 |
| 3,019,084 | 1/1962 | Amstein | 23—204 |

FOREIGN PATENTS

| 435,754 | 9/1935 | Great Britain. |

TOBIAS E. LEVOW, *Primary Examiner.*

JOHN R. SPECK, *Examiner.*

J. POER, *Assistant Examiner.*